United States Patent [19]

Duse

[11] Patent Number: 4,892,763

[45] Date of Patent: Jan. 9, 1990

[54] BOTTLE GRADE POLYESTER RESINS REINFORCED WITH GLASS FIBERS AND CONTAINERS MADE OF SUCH RESINS

[76] Inventor: Diego Duse, Via Osmano, n. 1, 24100 Bergamo, B.G., Italy

[21] Appl. No.: 692,355

[22] Filed: Jan. 16, 1985

[30] Foreign Application Priority Data

May 1, 1984 [GB] United Kingdom ................ 8411095

[51] Int. Cl.$^4$ .............................................. B27N 5/02
[52] U.S. Cl. ................... 428/34.1; 428/35.1; 428/35.7; 428/36.4; 428/36.92; 428/325; 428/480; 428/500; 428/522; 428/542.8; 524/503; 524/586; 524/605
[58] Field of Search ........................ 428/35, 34.1, 35.1, 428/35.7, 36.4, 36.92, 325, 480, 500, 522, 542.8; 524/503, 586, 605

[56] References Cited

U.S. PATENT DOCUMENTS

| | | | |
|---|---|---|---|
| 3,368,995 | 2/1968 | Furukawa et al. | 260/40 |
| 3,733,300 | 5/1973 | Wyeth et al. | 260/75 |
| 3,953,394 | 4/1976 | Fox et al. | 524/86 |
| 4,123,415 | 10/1978 | Wambach | 524/451 |
| 4,154,920 | 5/1979 | Jabarin | 528/272 |

FOREIGN PATENT DOCUMENTS

| | | |
|---|---|---|
| 2212942 | 10/1972 | Fed. Rep. of Germany . |
| 3310951 | 9/1984 | Fed. Rep. of Germany . |
| 2011921 | 7/1979 | United Kingdom . |

OTHER PUBLICATIONS

Chemical Abstracts, vol. 87, No. 10, 5th Sep. 1977, p. 38, No. 69186d, Columbus, Ohio.

Modern Plastics Encyclopedia, Oct. 1983, vol. 60, #10A, pp. 46, 122, 123.

*Primary Examiner*—Ellis P. Robinson
*Assistant Examiner*—P. J. Ryan
*Attorney, Agent, or Firm*—Christie, Parker & Hale

[57] ABSTRACT

The invention relates to fiber glass reinforced resins suitable to be used for producing articles such as containers, bottles and the like by stretch-blowing, and it relates also to the so obtained articles.

The resins are mixed with from 0.3% to 5% by weight of glass fibers having a diameter from 5 to 20 microns and chopped to lengths such that the length to diameter ratio ranges between 50 to 1000.

17 Claims, No Drawings

BOTTLE GRADE POLYESTER RESINS REINFORCED WITH GLASS FIBERS AND CONTAINERS MADE OF SUCH RESINS

BACKGROUND OF THE INVENTION

Priority is claimed from United Kingdom application 8411095, filed May 1, 1984.

This invention relates to bottle grade polyester resins—in particular bottle grade polyethylene terephthalate (PET) resins—reinforced with glass fibers and to containers made of such resins.

It is known that many kinds of high molecular weight polyester resins, in particular PET resins, are widely used for molding plastic articles. Resins of this type and their production are described in U.S. Pat. No. 4,123,415.

By making use of these resins it is possible to produce many kinds of shaped articles such as sheets, plates, and other parts. Bottles and containers can be made by injection or compression moulding, by extrusion blow molding, or by stretch-blowing molding. In injection or compression molding, the resin is injected or compressed into the cavity of a mold from which bottles or containers are removed after the resin solidifies in a crystallized form.

In injection stretch-blowing the resin to be used must have suitable features and is of a type which is known in the art with the name "bottle grade". In stretch-blowing molding, the first step is the production of a preform. Thereafter, the preform is transformed into a finished container by preheating it to about 90° to 100° C. and then mechanically stretching and blowing the preform in a mold having the configuration of the final container. In the containers obtained with the stretch-blowing molding procedure, the polymer chains of the resin are oriented in two directions at 90° to each other, along the longitudinal axis and along the circumference of the container, and are thus referred to as being biaxially oriented or bioriented. Biorientation of the polymer chains greatly improves the strength and mechanical properties of the container, and also reduces the gas permeability of the container. For this reason, bioriented PET containers are used to package many marketable goods, particularly foods and beverages.

Furthermore, in the containers obtained by stretch-blowing, the resin is in amorphous form which is important for the best clarity and transparency of the containers. However, such bioriented PET bottles will shrink or distort their shape when filled with hot materials, or when filled and sealed with a pressurized product and heat-treated to pasteurize the product as in the case of beer or orange juice. When the pressurized materials are pasteurized, the increase in temperature will produce an increase in the internal pressure and a decrease of the wall strength of the container. This combined effect leads to distortion or even to the failure of the container.

It is known that the strength and thermal stability of polyester resins may be improved by intimately blending such resins with reinforcing fibers, such as glass or quartz fibers. See for example, the PET-fiber glass compositions disclosed in U.S. Pat. No. 3,814,725, containing 20 to 60% by weight of fiber glass.

The increased strength of such PET-fiber glass compositions, however, prevents them from being stretched and blown on machines such as described in U.S. Pat. No. 4,105,391 where PET preforms are generally heated to about 90° to 100° C., and subjected to the action of a stretch-blow rod which exerts an axial mechanical pressure on the parison and injects pressurized air to stretch and blow the parison into the shape of a bottle mold.

Lowering the fiber glass content of such compositions could decrease their strength to a point where they may be stretched and blown on such machines. However, the lower the percentage content of fibers in the resin the worse are the mechanical features of such compositions.

This is confirmed by lines 44–66, col. 1 of U.S. Pat. No. 4,123,415 wherein it is stated that it is known that when glass fibers having a standard diameter of 0.00051 to 0.00055 inches are used in various thermoplastic polyester compositions where the glass fiber concentration is less than 20%, the deflection temperature under load is markedly reduced. This reduction in the heat deflection temperature under load is undesirable when the thermoplastic polyester is to be used in applications involving exposure to rather high temperature. This means that in such reinforced resins the concentration of glass fibers, with the fibers having the above referred diameter, can be reduced to such a low amount that the same could perhaps be used for producing, at a temperature of about 100° C., containers with the stretch-blowing process. Such containers would, however, be surely unsuitable for use where hot-filling or heat sterilization before filling are required, especially when the container has to be filled with a substance which has to be pasteurized or the like, as explained in the foregoing. Indeed such containers would be surely distorted or they could even fail under the combined effect of the increase of temperature and of internal pressure.

This is confirmed by the fact that all available commercial data suggests that at least 10% of fiber glass has to be employed to obtain any significant improvement in the mechanical properties and thermal stability in polyester resin-fiber glass compositions.

In order to improve retention of heat deflection properties of reinforced thermoplastic resins, U.S. Pat. No. 4,123,415 has proposed to reinforce said resins with glass fibers having a diameter lower than 0.0005 inches, said glass fibers being present in an amount (from 1% to about 60% by weight of the combined weight) at least sufficient to improve the deflection by heat of said fibers. In other words, said patent claims glass fibers reinforced resins in which the heat deflection temperature is reduced to a much lesser extent in comparison with previously known reinforced resins. Indeed, as seen from the examples forming part of the U.S. Pat. No. 4,123,415, the reinforced resins disclosed therein have heat distortion temperatures which are much higher than those obtainable according to the prior art.

U.S. Pat. No. 4,123,415 reports data indicating that improved PET properties are achieved using fiber glass concentrations as low as 7% by weight, provided the average diameter of the fiber glass is maintained below 0.0005 inches. That patent alleges that as little as 1% of fiber glass having said diameter may be used to improve the aforesaid properties, but extrapolation of the actual test data of examples 1 to 4 of the patent does not suggest any beneficial effect at such low concentrations of fiber glass.

Since the object aimed at by said patent is to obtained reinforced resins having improved resistance to deflection by heat, it is obvious that glass fibers can advantageously be used bundled into yarns or ropes or woven into mats. Indeed, in col. 4, lines 12–16 of the U.S. Pat. No. 4,123,415 there is specified that "the length of the glass filaments and whether or not they are bundled into fibers and the fibers bundled in turn into yarns, ropes or rovings, or woven into mats, and the like, are also not critical to the invention".

It is also obvious that the reinforced resins according to the U.S. Pat. No. 4,123,415 are not suitable for stretch-blow molding where resin preforms must be stretched and blown at relatively low temperatures, and where crystallization is to be avoided because it detracts from the appearance and marketability of the polyester resin containers. In the present invention, as described below, it will be noted that in contrast to U.S. Pat. No. 4,123,415, the length to diameter (L/D) ratio of the glass fibers is an important consideration in injection stretch-blowing of polyester resin (PET)-fiber glass compositions and that also the diameter of said fibers and their amount in the compositions are key factors.

SUMMARY OF THE INVENTION

It has now been surprisingly discovered that reinforced resins suitable to be used for producing containers, bottles and the like by stretch-blowing, consists of mixtures of at least one bottle grade high molecular weight polyester resin and of a reinforcement therefor consisting of glass fibers and the like, wherein said glass fibers are present in an amount of from between about 0.3% and 5% by weight, the fibers having a diameter of from about 5 to about 20 microns and being chopped to lengths such that the length to diameter (L/D) ratio ranges between about 50 to about 1000, such ratio being referred to as the aspect ratio.

Glass fibers having the aforesaid aspect ratio tend to resist fracturing during stretch-blow molding. Excessive fracturing of the glass fibers will diminish the improved properties of the PET-fiber glass mixtures of the present invention and is to be avoided.

Preferably, the L/D ratio is about 400 and the fiber glass concentration is about 2% by weight of the total polyester resin-fiber glass mixture. The density of the glass fibers is about 2.2 to about 2.6 grams per cubic centimeter. The polyester resin is preferably a PET resin.

DETAILED DESCRIPTION OF THE PREFERRED EMBODIMENT

The glass fibers used in the present invention are uniformly blended with the resin and are preferably provided with a bonding agent on the surface of said fibers, such as polyvinyl acetate in an amount of about 1% the total weight of the fibers. The bonding agent provides an adhesive surface on the fibers to prevent any tendency of the fibers to slip against the PET polymeric chains and decrease the strength provided by the fibers.

Stretch-blown bottles produced with the PET-fiber glass mixtures of the present invention show greatly improved mechanical strength, thermal stability, and dimensional stability when subjected to elevated temperatures, or when filled with a pressurized liquid and subjected to elevated temperatures. This is indeed surprising because no significant improvement of the aforesaid properties was expected at the low levels of fiber glass employed herein. The following examples, which are not to be construed as limiting the invention thereto, illustrate the invention.

EXAMPLE I

A PET-fiber glass mixture was prepared containing 1.84% by weight of E type fiber glass having an average diameter of about 11 microns and a L/D ratio of about 400. The PET resin was a bottle grade resin supplied by Imperial Chemical Industries of England under the trade name "Melinar", having an intrinsic viscosity of 0.72 deciliters per gram.

This mixture was used to stretch-blow 500 ml bottles having a threaded neck. Each bottle weighed approximately 34.6 grams. The same mixture, but without fiber glass, was used to stretch and blow bottles of the same size and weight. The bottles with and without fiber glass were filled with water, pressurized by injecting 3.4 volumes $CO_2$ gas at ambient temperature and pressure per volume of water, and sealed with a cap screwed onto the threaded neck of the bottle. The bottles were then immersed in a water bath at 65° C. for 15 minutes, after which they were removed and measured to determine the comparative change in the dimensions of their overall height, body diameter, and neck diameter at a location below the cap used to seal the bottle. The results, measured in millimeters, are reported in Table I.

TABLE I

| Dimension | PET Only | 1.84% Fiber Glass | Reduction in Growth Using Fiber Glass | Percentage of Growth Reduction Using Fiber Glass |
|---|---|---|---|---|
| Original Bottle Height (a) | 183.74 | 183.84 | | |
| Bottle Height After Water Bath (b) | 190.80 | 189.40 | | |
| Growth in Bottle Height (b − a) | 7.06 | 5.56 | 1.5 | 21% |
| Original Body Diameter (a) | 73.30 | 73.12 | | |
| Body Diameter After Water Bath (b) | 75.62 | 74.16 | | |
| Growth in Body Diameter (b − a) | 2.32 | 1.04 | 1.28 | 55% |
| Original Diameter of Bottle Neck Below Cap (a) | 25.91 | 26.04 | | |
| Neck Diameter After Water Bath (b) | 26.70 | 26.42 | | |
| Growth in Neck | | | | |

TABLE I-continued

| Dimension | PET Only | 1.84% Fiber Glass | Reduction in Growth Using Fiber Glass | Percentage of Growth Reduction Using Fiber Glass |
|---|---|---|---|---|
| Diameter (b − a) | 0.79 | 0.38 | 0.41 | 52% |

EXAMPLE II

Example I was repeated except that the PET-fiber glass mixture contained 1.95% fiber glass, and the volume of the bottles stretch-blown with said mixtures was 1.5 liters. Each bottle weighed 51 grams. In addition, the bottled were filled with water, pressurized by injecting 3.6 volumes of $CO_2$ gas at ambient temperature and pressure per volume of water, and held in a water bath at 66° C. for 25 minutes. The comparative change in dimensions of the diameter and height of the bottles were measured when empty, after being filled, and after the water bath, and are reported in millimeters in Table II.

TABLE II

| Dimension | PET Only | 1.95% Fiber Glass | Reduction in Growth Using Fiber Glass | Percentage of Growth Reduction Using Fiber Glass |
|---|---|---|---|---|
| Body Diameter When Empty (a) | 85.2 | 85.7 | | |
| Body Diameter After Filled and Pressurized | 86.2 | 86.5 | | |
| Body Diameter After Water Bath (b) | 88.0 | 86.7 | | |
| Growth in Body Diameter (b − c) | 2.8 | 1.0 | 1.8 | 66% |
| Bottle Height When Empty (a) | 329.6 | 330.8 | | |
| Bottle Height After Filled and Pressurized | 331.7 | 332.9 | | |
| Bottle Height After Water Bath (b) | 355.7 | 341.0 | | |
| Growth in Bottle Height (b − a) | 26.1 | 10.2 | 16.1 | 61% |

The results in Tables I and II demonstrate a dramatic reduction in bottle growth when relatively small quantities of fiber glass are incorporated into PET bottles.

EXAMPLE III

PET mixtures of Example I were prepared except that the fiber glass containing mixture had a fiber glass content of 2%. The stretch-blown bottles prepared from the Example I mixtures had a volume of 250 ml and a concave type bottom referred to as a "champagne" bottom. Each bottle weighed 25 grams. The bottles were subjected to a top loading force at room temperature. The bottle containing PET only failed at a top load force of 47.5 kilograms, whereas the bottle containing 2% fiber glass failed at 65.5 kilograms, a dramatic increase in strength in view of relatively small addition of fiber glass. Both bottles were filled with pressurized air and at a pressure of 10 kilograms per square centimeter, the bottom of the PET bottle popped out and the bottle containing fiber glass burst at the bottom.

The presence of the glass filament network in inside the polymer mass permits the achievement of other important advantages. When the preform is stretch-blown into a bioriented bottle, the glass structure will be pantographically enlarged in all stretched areas. However, there is relatively little biorientation in the neck, mouth and bottom regions of the bottles. The lack of such biorientation would normally result in poor properties in such regions. However, the wall thickness and fiber glass concentration in such regions are correspondingly greater and thus compensate for the lack of biorientation so that the mechanical properties and thermal stability in such regions are not diminished.

What is claimed is:

1. A container made by stretch-blow molding a preform to produce an amorphous, biaxially oriented container, said preform molded from mixtures of at least one bottle grade high molecular weight polyester resin and chopped reinforcing fibers, said fibers present in an amount from about 0.3 to 5% by weight of said mixture, having a diameter of from about 5 to about 20 microns, and having lengths such that the length to diameter (L/D) ratio of said fibers ranges between about 50 to about 1000, said resins being free of nucleating agents designed to crystallize said containers.

2. A container set forth in claim 1 wherein said reinforcing fibers are selected from the group consisting of glass fibers and quartz fibers.

3. A container set forth in claim 1 or 2 wherein the L/D ratio is about 400.

4. A container set forth in claim 1 or 2, wherein the concentration of reinforcing fibers is about 2% by weight of the total mixture.

5. A container set forth in claim 1 or 2, said reinforcing fibers have an average diameter of about 11 to 12 microns.

6. A container set forth in claim 1 or 2, wherein said polyester resin in a polyethylene terephthalate resin.

7. A container set forth in claim 1, wherein said fibers have an adhesive bonding agent on the surface thereof.

8. A container as set forth in claim 7 wherein said adhesive bonding agent is polyvinyl acetate.

9. A container set forth in claim 1 or 2, wherein said container is molded by injection stretch-blow molding.

10. Reinforced bottle grade polyester resins for stretch-blow molding preforms made of such resins into amorphous, biaxially oriented containers, said resins comprising mixture of at least one bottle grade high molecular weight polyester resins and chopped reinforcing fibers, said fibers present in an amount of from about 0.03 to 5% by weight of said mixture, having a diamter of from about 5 to about 20 microns, and having lengths such that the length to diameter (L/D) ratio of said fibers ranges between about 50 to 1000, said resins being free of nucleating agents designed to crystallize said containers.

11. Reinforced bottle grade polyester resins set forth in claim 10 wherein said reinforcing fibers are selected from the group consisting of glass fibers and quartz fibers.

12. Reinforced resins as in any one of the preceding claims wherein the L/D ratio is about 400.

13. Reinforced resins set forth in claim 10 or 11 wherein the concentration of reinforcing fibers is about 2% by weight of the total mixture.

14. Reinforced resins set forth in claim 10 or 11, wherein said reinforcing fibers have an average diameter of about 11 to 12 microns.

15. Reinforced resins set forth in claim 10 or 11 wherein said polyester resin is a polyethylene terephthalate resin.

16. Reinforced resins set forth in claim 10 or 11, wherein said fibers have an adhesive bonding agent on the surface thereof.

17. Reinforced resins set forth in claim 16 wherein said adhesive bonding agent is polyvinyl acetate.

* * * * *

UNITED STATES PATENT AND TRADEMARK OFFICE
CERTIFICATE OF CORRECTION

PATENT NO. : 4,892,763
DATED : January 9, 1990
INVENTOR(S) : Diego Duse

It is certified that error appears in the above-identified patent and that said Letters Patent is hereby corrected as shown below:

```
Column 2, line 44, change "inches" to -- inch --.
Column 2, line 60, change "inches" to -- inch --.
Column 2, line 66, change "obtained" to -- obtain --.

Column 4, line 28, change "a" to -- an --.

Column 5, line 14, change "bottled" to -- bottles --.
Column 5, line 63, after "network" delete -- in --.

Column 6, line 61, change "in" to -- is --.
Column 6, line 62, after "1" insert -- or 2 --.

Column 7, line 4, after "comprising" insert -- a --.
Column 7, line 6, after "amount" delete "of".
Column 7, line 8, change "diamter" to -- diameter --.

Column 8, lines 1,2, delete "as in any one of the preceding
Claims" and insert therefor -- set forth in claim 1 or 2 --.
```

Signed and Sealed this

Third Day of December, 1991

*Attest:*

HARRY F. MANBECK, JR.

*Attesting Officer*   *Commissioner of Patents and Trademarks*